United States Patent [19]

Shinohara et al.

[11] Patent Number: 4,558,369
[45] Date of Patent: Dec. 10, 1985

[54] FACSIMILE CONNECTION SYSTEM

[75] Inventors: Masaru Shinohara, Higashiyamoto; Makoto Ueno, Tokyo; Tsunetaka Sakata, Hachioji, all of Japan

[73] Assignee: Iwasaki Tsushinki Kabushiki Kaisha, Tokyo, Japan

[21] Appl. No.: 565,626

[22] Filed: Dec. 27, 1983

[30] Foreign Application Priority Data

Dec. 28, 1982 [JP] Japan ................................. 57-227514
Dec. 28, 1982 [JP] Japan ................................. 57-227520

[51] Int. Cl.$^4$ .......................... H04N 1/32; H04N 1/44
[52] U.S. Cl. .................................... 358/257; 358/259; 179/2 DP
[58] Field of Search .............. 358/256, 257, 258, 259; 179/2 R, 2 DP, 18 C, 1.5

[56] References Cited

U.S. PATENT DOCUMENTS

| | | | |
|---|---|---|---|
| 3,084,213 | 4/1963 | Lemelson | 358/257 |
| 3,592,962 | 7/1971 | Mathews et al. | 358/256 |
| 3,824,334 | 7/1974 | Jacolsson et al. | 179/2 DP |
| 4,419,697 | 12/1983 | Wada | 358/258 |
| 4,476,559 | 10/1984 | Brolin et al. | 179/2 DP |

Primary Examiner—Howard W. Britton
Assistant Examiner—John K. Peng
Attorney, Agent, or Firm—Robert E. Burns; Emmanuel J. Lobato; Bruce L. Adams

[57] ABSTRACT

A facsimile connection system, which is provided with a plurality of facsimile terminal equipments having no CO line interface circuit, at least one facsimile signal processor having a CO line interface circuit, and an exchange for interconnecting the plurality of facsimile terminal equipments and the facsimile signal processor, so that the facsimile terminal equipments can use the facsimile signal processor in common to them. An additional information generator may be further provided in common to the facsimile terminal equipments so as to be connected to the exchange.

6 Claims, 8 Drawing Figures

FACSIMILE CONNECTION SYSTEM

BACKGROUND OF THE INVENTION

The present invention relates to a facsimile connection system for facsimile transmission which employs a plurality of facsimile terminal equipments at an office or a factory, etc.

In case of using a plurality of facsimile equipments (G3 facsimile by CCITT Recommendation T4) at an office or a factory, etc., each facsimile equipment has been provided with a redundancy compander-MODEM unit. In this case, however, the redundancy compander-MODEM unit can be used in common to the facsimile equipments, and its provision for each facsimile equipment is uneconomical.

Further, in the conventional facsimile equipment, sub-scanning is carried out by a stepping motor for compressing redundancy. The use of the stepping motor poses a problem of noise by the sub-scanning and, at the same time, seriously impairs the picture quality because of non-uniform sub-scanning. To avoid these problems, it is considered to perform the sub-scanning at a fixed speed and to conduct a buffering operation with the redundancy compander through the use of a memory. Taking into account a fact that scanning is not interrupted in any case, it is necessary that the memory has a capacity large enough to store information of a frame of original picture including a document. For example, in case of scanning an original picture of A4 size being scanned with 8 main scanning lines per millimeter and 7.7 sub-scanning lines per millimeter, a memory capacity of about 4 megabits is required. The provision of such a large memory for each facsimile equipment is not economical and makes the equipment bulky, and hence is impractical.

SUMMARY OF THE INVENTION

In view of the above, an object of the present invention is to provide a facsimile connection system in which a plurality of facsimile equipments are connected to an analog signal exchange, and a MODEM, a redundancy compressing and companding section and a memory are provided in a facsimile signal processor having a CO line interface circuit so that they may be used in common to the plurality of facsimile equipments.

In a case where a plurality of facsimile equipments are connected to a digital speech exchange in a system to use some portion of the system in common to them, it will naturally pose a problem to which extent the portion be made common and, at the same time, the transmission rate of an intercommunication which performs facsimile communication without utilizing the common portion must also be taken into consideration. Since the intercomm service area of the exchange has a radius of approximately 1 kilo-meter, the intercommunication is also effective communication means and, in this case, it is desirable that the intercommunication be higher in transmission rate than the CO line (i.e. public subscriber line) communication. When the common portion is limited to the MODEM, the redundancy compressing and companding section is provided in each facsimile terminal equipment. In this case, a digitalized voice signal is sampled at a sampling frequency of 8 KHz and one sampled value is represented by eight bits, so that the transmission rate is 64 KBPS (kilo-bits per second), and even if data is transmitted at the same transmission rate as the digital voice signal, a sufficiently high-speed intercomm transmission can be achieved, taking into consideration that the transmission rate of the G3 facsimile is 9.6 KBPS at the highest. With the provision of the redundancy compander in each terminal equipment, however, the terminal equipment becomes bulky and the costs increase and, further, the problem of noise by the sub-scanning is still unsettled. Next, in a case where the redundancy compressing and companding section is also made common in addition to the MODEM and the intercomm transmission is carried out with 64 KBPS, the terminal equipment conducts the subscanning at a fixed speed. That is, a facsimile signal of redundancy is transmitted and, in this case, assuming that an original document of A4 size is scanned with 8 lines per millimeter for the main scanning and 7.7 sub-scanning lines per millimeter, the amount of information of a frame of picture is about 4 megabits, resulting the time for intercomm transmission becoming approximately one minute. With the G3 facsimile, a picture of high redundancy can be transmitted in 20 sec. or so and, accordingly, when the transmission rate of the intercomm transmission is lower than the above, there occurs a time duration in which the CO line is not used; hence, too low a transmission rate is undesirable. To avoid this, there is a strong demand for such a method that permits the intercomm transmission within the minimum transmission time of the G3 facsimile and makes the facsimile terminal equipment smaller, less expensive and less noisy. In this case, since the voice signal exchange is utilized, it is necessary that the method is able to coexist with the voice signal and makes most use of facilities for the voice signal.

BRIEF DESCRIPTION OF THE DRAWINGS

The present invention will be described in detail below with reference to the accompanying drawings, in which.

DETAILED DESCRIPTION

Embodiments of the present invention will hereinafter be described.

Figure 1:
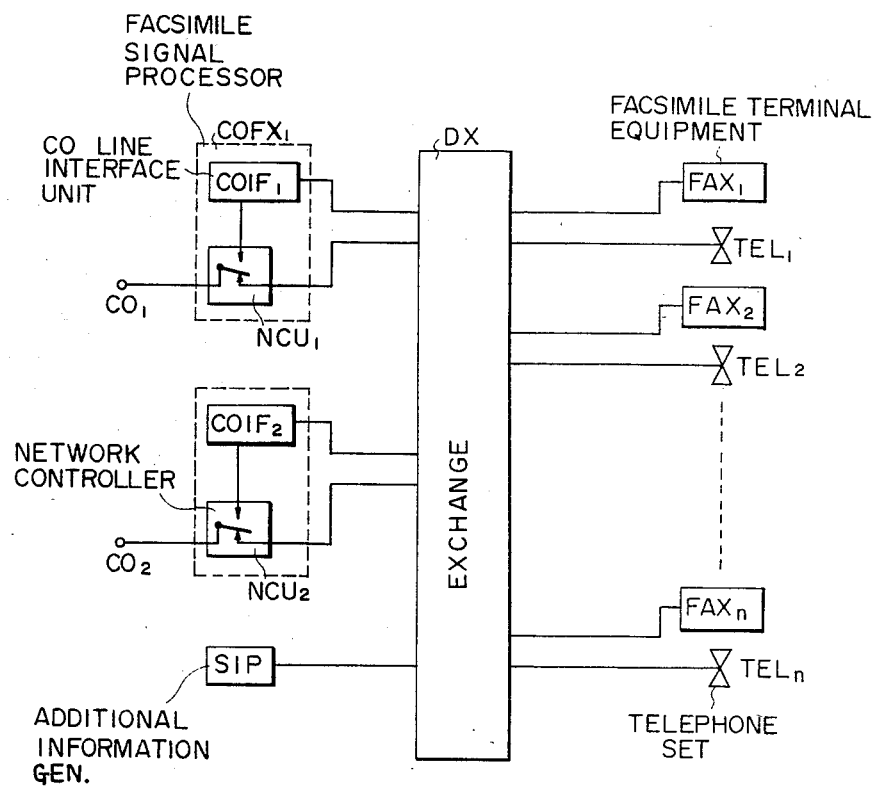
FIG. 1 is a block diagram explanatory of the outline of the present invention.

FIG. 1 is a block diagram explanatory of the outline of the present invention. In FIG. 1, reference character DX indicates an exchange having a function of exchanging digital signals, FAX facsimile terminal equipments each of which scanns and records a facsimile picture, TEL telephone sets, COFX facsimile signal processors each of which comprises a facsimile CO line interface unit COIF for compressing and expanding the redundancy of a facsimile signal and for modulating and demodulating the facsimile signal and a network controller NCU, and SIP an additional information generator which is used for additionally recording service information in the margin of a facsimile picture. The telephone sets TEL, the facsimile terminal equipments FAX, the facsimile signal processors COFX and the additional information generator SIP are connected via an intercomm transmission line (about 1 Km at the longest) to the exchange DX. The connection for an exchange in the system is performed in the form of a pair of connections for voice talking communication and for facsimile communication. That is, in the embodiment of the present invention, since the facsimile terminal equipment FAX is not equipped with dial and talking functions, it is connected by the telephone set to the exchange while the facsimile communication follows the connection for voice talking communication. Since the voice signal and the facsimile signal are connected via separate routes, however, the voice talking communication and the facsimile communication can be performed simultaneously. The facsimile signal processor. COFX is connected to an intercomm line and, at the same time, it is also connected to a public telephone circuit CO (the central office line). In case of using the CO line CO, since the voice talking communication and the facsimile communication cannot naturally be carried out simultaneously, a voice channel is established at first and then it is switched to the facsimile communication. The numbers of the telephone set TEL, the facsimile terminal equipment FAX, the facsimile signal processor COFX and the additional information generator SIP, which form this system, can be increased in accordance with the frequency of use, making it possible to constitute an optimal system which meets the user's requirements.

Figure 2:
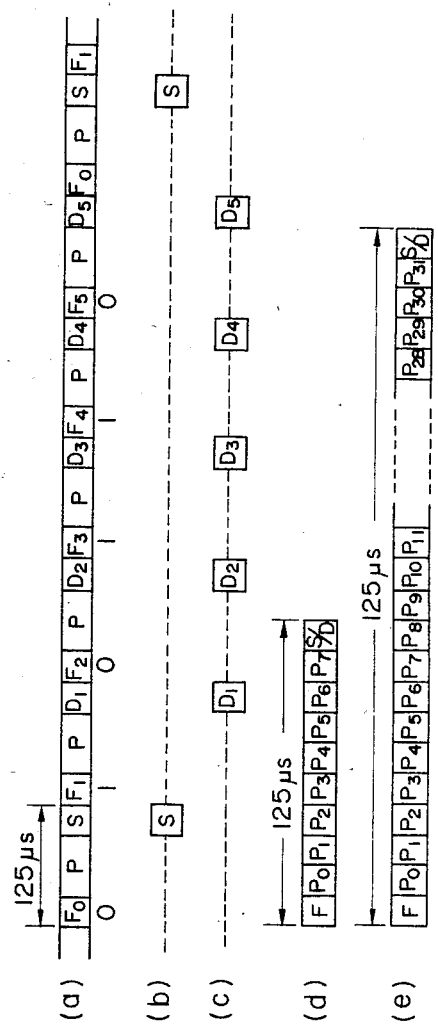
FIG. 2 is a timing chart explanatory of the format of a transmission signal for use in the present invention.

FIG. 2 shows a series of diagrams explanatory of signal formats for the intercomm transmission. FIG. 2A shows the transmission format of voice information or facsimile information which is transmitted among the exchange DX and the telephone set TEL, the facsimile terminal equipment FAX, the facsimile signal processor COFX and the additional information generator SIP (hereinafter referred to as the terminal equipments). Reference character P identifies sections for coded voice signals or facsimile signals, S sections for transmitting dial information and supervisory information between the exchange DX and the terminal equipments, $D_1$ to $D_5$ (D bits) sections for transmitting mutual control information between the terminal equipments, and $F_0$ to $F_5$ (F bits) sections for transmitting a fixed pattern [010110] for the synchronization of the system. The positions of the S bits and D bits can be detected by the detection of the fixed pattern. The unit formed by the sections F, P and S or D is called a frame while the transmission time of one frame is 125 microseconds, but the S bit is once transmitted per sixth frames as shown in FIG. 2B and the D bit is transmitted five times for six frames as shown in FIG. 2B. The exchange DX and each terminal equipment are connected via four lines in practice, two of which transmit downward information from the exchange DX to each terminal equipment, and the other two of which transmit upward information from each terminal equipment to the exchange DX. That is, the transmission system is the full duplex communication type. FIG. 2D shows one frame in case of voice information. The voice signal is formed by eight bits. FIG. 2E shows one frame in a case of the facsimile information, and the facsimile signal is formed by 32 bits four times as many as the bits of the voice signal. Such a digital transmission is not effected throughout the system. In a case where the voice signal from the exchange DX to the CO line CO is a decoded analog signal while the telephone set TEL is a telephone set of an ordinarly structure in FIG. 1, an analog voice signal is also transmitted between the telephone set TEL and the exchange DX so that it is coded in the exchange DX to pass through a channel switch.

Figure 3:
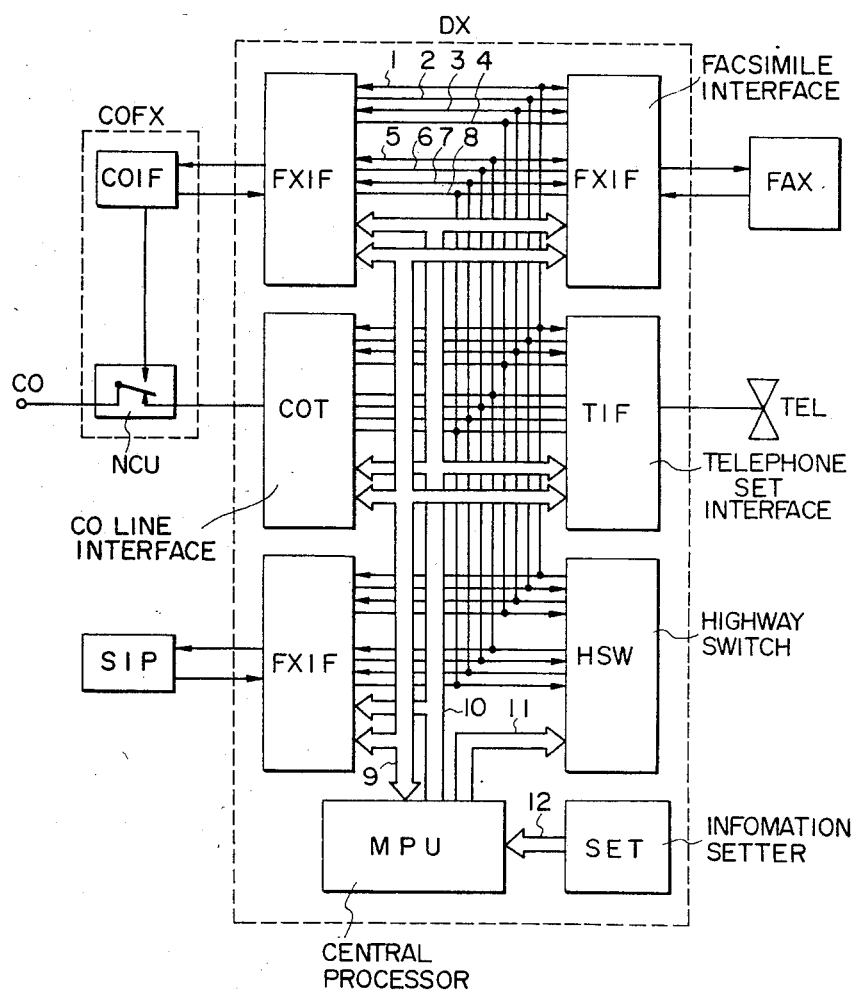
FIG. 3 is a block diagram illustrating an example of an exchange for use in the present invention.
Figure 4:
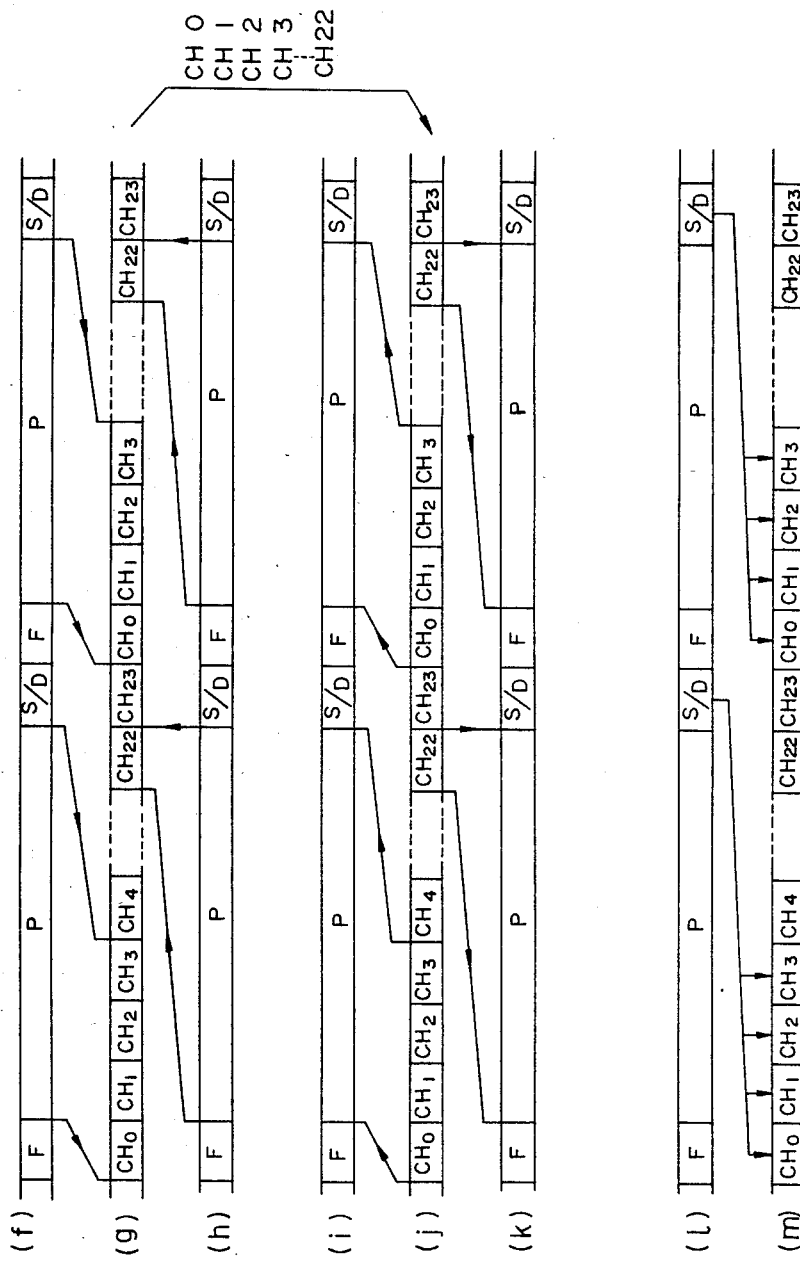
FIG. 4 is a timing chart explanatory of how a signal is exchanged in the present invention.
Figure 5:
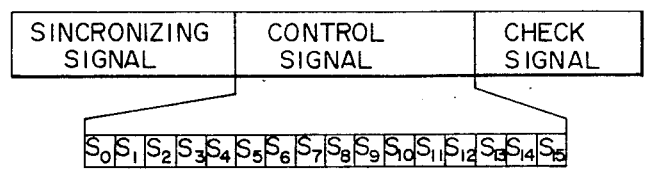
FIG. 5 is a timing chart of the transmission format of S bits for use in the present invention.

FIG. 3 is a diagram for a detailed description of the internal arrangement of the exchange DX shown in FIG. 1. Lines 1 to 8 are data highways (channel switches) for transmitting the voice signals, the facsimile signals and control signals (D bit). The four lines 1 to 4 and the other four lines 5 to 8 respectively constitute two sets of data highways. The lines 1 and 5 are receiving highways (RHW), the lines 2 and 6 transmitting highways (THW), the lines 3 and 7 D-bit receiving highways (DRHW) and the lines 4 and 8 D-bit transmitting highways (DTHW). A description will be given, with reference to FIG. 4, of an example of how a signal is provided on the data highway, exchanged and taken out. In FIG. 4, the facsimile signal in upward facsimile information received by a facsimile interface FXIF is formed by 32 bits and calls for channels four times as many as those for the voice signal, and hence it is transmitted on the transmitting highway THW (for example, 2 in FIG. 3) through using four channels $CH_0$ to $CH_3$. The facsimile is transferred by a highway switch HSW to the receiving highway RHW (for example, 5 in FIG. 3) to which the facsimile interface FXIF of the opposite party is connected, and the facsimile signal is taken out from the receiving highway RHW. Further, the voice signal is transmitted on a channel CH22 of the transmitting highway THW (for example, on the line 2 from TIF in FIG. 3) and taken out via the highway switch HSW from the channel CH22 of the receiving highway RHW (for example, from the line 5 to the CO line interface COT in FIG. 3). In FIG. 4, the actual passage of time is not taken into account. The D bit for direct control between the terminal equipments is transmitted through the D-bit transmitting highway DTHW and the D-bit receiving highway DRHW. As shown in FIGS. 4(*l*) and (*m*), the highways for the D bits are also comprised of 24 channels, and the D bits have one-to-one correspondence to the channels and are exchanged in relation to the transmitting highway THW. The receiving highway RHW and the D bits bear the same relation as mentioned above, though not shown. Especially, in case of the facsimile signal, the contents of four channels are identical and exchanged. Incidentally, only two sets of data highways are shown in FIG. 3 but, in practice, more data highways are prepared while the highway switch HSW operates to transfer the signal on the transmitting highway THW or the D-bit transmitting highway DTHW to the receiving highway RHW or the D-bit receiving highway DRHW of the opposite party in accordance with instructions from a central processor MPU (a bus 11 being a control bus for instructions). Reference numeral 9 identifies a control bus through which the central processor MPU receives upward control information from interfaces, such as the facsimile interface FXIF, the telephone set interface TIF and the CO line interface COT, or outputs downward control information to such interfaces. Reference numeral 10 designates a select signal bus through which the central processor MPU instructs to the interfaces the timing for sending-out the facsimile signal or the voice signal on the data highways. The facsimile interface FXIF receives facsimile information from an intercomm upward transmission line and analizes it into the S, D and P bits as shown in FIG. 2. The facsimile interface delivers the P bit onto the transmitting highway THW and the D bit on the D-bit transmitting highway DTHW in accordance with instructions using the select signal bus 10, and temporally stores the S bit after decoding it so that it may be delivered onto the control bus 9 at a request from the central processor MPU. Further, the facsimile interface combines the P and D bits taken out of the receiving highway RHW and the D-bit receiving highway DRHW into such a format as shown in FIG. 2 and, at the same time, transmits a required one of control signals from the central processor MPU to the terminal equipments through using the S bit. The telephone set interface TIF performs relaying operations for transmission and reception of voice information by the same operation as that of the facsimile interface FXIF and responds to a dialling operation from the telephone set TEL to request the central processor MPU for connecting it to the opposite party. In a case where the telephone set TEL is an ordinary telephone set as shown in FIG. 3, the telephone set interface TIF performs encoding and decoding operations of the analog voice signal to interface with the data highway. Reference COT is the CO line interface, which performs inputting and outputting operations of a control (incoming call detection and call originating sequence) signal for a talking operation and encoding and decoding operations of the analog voice signal. Reference MPU is a central processor mainly performs the control of operations in the exchange and controls the operation of each interface. Reference SET is a unit into which the operator inputs information for indicating the central processor MPU of the status of the apparatus. That is, it is a semi-fixed setting unit for indicating to which channel of which data highway the facsimile terminal equipment corresponds and to which telephone set the facsimile terminal equipment forms a counterpart. The S bits used for the transmission of control signal among the facsimile interface FXIF and the facsimile terminal equipment FAX, the facsimile signal processor COFX and the additional information sender SIP are formed as illustrated in FIG. 5. Each bit in FIG. 5 is transmitted once for six frames together with the facsimile signal. A synchronizing signal is a 12-bit fixed pattern signal [111111111110], a control signal is represented by 16 bits from $S_0$ to $S_{15}$ and check bits are composed of eight bits, thereby to detect an error during transmission. The contents of the upward S-bit control signal are as follows: a bit $S_0$ represents whether the terminal equipment is operable or not; a bit $S_1$ whether the terminal equipment is making a request for connection of a call or not; a bit $S_2$ whether the terminal equipment is making a request for clearance or not; a bit $S_3$ whether the terminal equipment performs automatic reception or not; a bit $S_4$ whether or not the terminal equipment is making a request for connection to the facsimile terminal equipment FAX, the facsimile signal processor COFX or the additional information generator SIP; a bit $S_5$ whether the terminal equipment is making a request for holding the connection or not; a bit $S_6$ whether the terminal equipment is making a request for re-connection of a call being held or not; and bits $S_7$ to $S_{15}$ are undefined and fixed to "0". The contents of the downward S-bit control signal are as follows: the bit $S_0$ represents whether the connection of a call has been completed or not, the bit $S_1$ whether the opposite party requested to be connected is operable or not, the bit $S_2$ whether the initiative of the inter-terminal control using the D bits is given or not (for smooth control by giving the initiative to one of the interconnected terminals), the bit $S_3$ whether the request of holding has been accepted or not, and the bits $S_4$ to $S_{15}$ are undefined and fixed to "0". It has already been described that the control signal between the fascimile interface FXIF and the central processor MPU is transmitted via the control bus (9 in FIG. 3), and its contents are as follows: The upward signal from the facsimile interface FXIF to the central processor MPU includes a request for connecting a call (the opposite party to be connected has already been set by the telephone set), a reconnecting request and the opposite party's number (in case of reconnecting a held call), a status indication as to whether the connecting request and the clearing request can be complied with or not(in cases of the terminal equipment being inoperable and held, the request cannot be accepted.). The downward signal includes information as to whether the opposite party is operable or not, information as to whether the connection of a call has been completed or not, clear completion information and the opposite party's telephone number.

The above is a description of details of the exchange DX. Next, an example of its operation will be described. Having received from the telephone set interface TIF the opposite party's number together with a request for connecting a call, the central processor MPU checks whether or not the request is acceptable by the opposite party's telephone set interface TIF and, if so, gives instructions to the highway switch HSW as to the data highway and the channel numbers for exchange, thereby to set a voice channel. In a case where a request for connecting a call is applied from one facsimile interface FXIF thereafter, it is tested whether another facsimile interface FXIF which forms an opposite party to a telephone set interface TIF forming a pair with the one facsimile interface FXIF is connectable or not to the one facsimile interface FXIF and, if connectable, the data highway and the channel numbers for exchange are indicated to the highway switch HSW as is the case with the voice, thereby connecting the two facsimile interfaces FXIF. In this case, four channels are indicated in one set. For clearing the call-connection, a request from the facsimile interface FXIF and a request from the telephone set interface TIF are complied with independently of each other.

Figure 6:
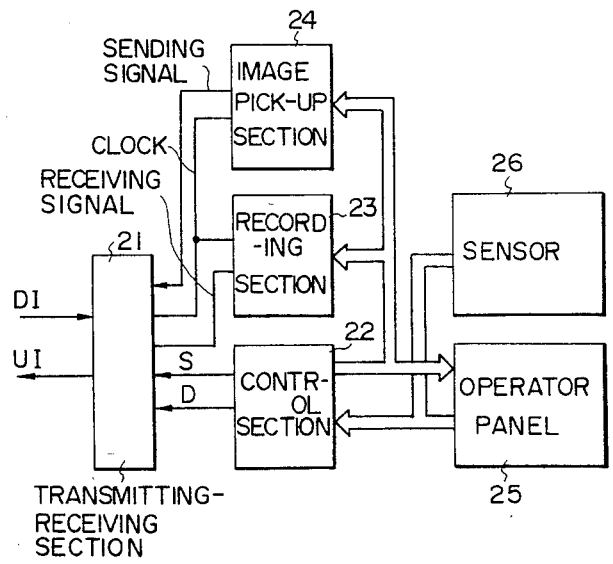
FIG. 6 is a block diagram illustrating an example of a facsimile terminal equipment for use in the present invention.

Next, a description will be given of the facsimile terminal equipment FAX. FIG. 6 is a block diagram illustrating an example of the facsimile terminal equipment FAX. In this block diagram, a transmitting-receiving section 21 is one that outputs downward information of such a format as shown in FIG. 2 to transmit the S and D bits to a control section 22 and the P bit to a recording section 23 together with clock pulses, and that receives a transmission signal from an image pick-up section 24 and combines S and D bits from the control section 22 with the P bit for transmission as upward information. The image pick-up section 24 is provided to scan a picture to pick up its video signal. The recording section 23 is provided to scan a recording paper for reproduce thereon the transmitted picture. The control section 22 is a main processing section of the facsimile terminal equipment FAX which transmits and receives the S and D bits, controls the image pick-up section 24 and the recording section to start and stop them, receives information from an operating part 25 and a sensor part 26 or outputs to the operating part 25 information. The sensor part 26 senses a picture to be transmitted and a recording paper. The operating part 25 is an operator panel which is comprised mainly of start and stop switches and lamps indicating three states of connection, transmission and reception. The control part 22, in the waiting state, tests the presence or absence of a recording paper by the recording paper sensor and, when the recording paper is present, it informs the operable state of the system by the S bit to the facsimile interface part FXIF. When the facsimile terminal equipment is put into operative state by the depression of the start switch, the control part provides a request for connecting a call to the facsimile interface part FXIF and, upon detection of completion of the connection of the call, it lights the connection indicating lamp and then starts control in relation to the opposite party through using the D bit. At this time, in a case where the initiative of control is given by the S bit and a picture to be transmitted is present, an instruction-to-receive is transmitted to the opposite party and the transmission indicating lamp is lighted. In the absence of the picture, an instruction-to-transmit is transmitted and the reception indicating lamp is lighted. In a case where no picture is present on both sides, a request for clearance is issued after a certain elapsed time. A normal request for clearance is provided at the completion of transmission or reception of a picture, or at the depression of the stop switch. In a case where the facsimile terminal equipment FAX is connected to the facsimile signal processor COFX, the operation differs from that in the case of the abovesaid intercommunication. During transmission, even if the transmission of a picture is completed, the connection is not cleared until after the CO line transmission is completed. That is, when there is present a picture to be transmitted next, its transmission is started after the CO line transmission. During reception, a recording operation is started after completion of the CO line reception of one picture and, after completion of the recording operation, a request for clearance is issued. In these cases, while the facsimile terminal equipment FAX is viewed to be not operative outwardly but realy at an operating state, the transmission or reception indicating lamp may be switched on and off to inform the operator that the equipment is in operation. It has already been described that the facsimile terminal equipment FAX transmits the facsimile signal at a speed (256 KBPS) four times higher than the voice signal, but in the case of scanning a picture of A4 size with 8 lines per millimeter for main scanning and 7.7 sub-scanning lines per millimeter, the transmission is approximately 16 seconds; this is shorter than the minimum transmission time of G3 facsimile and the CO line does not become idle. Further, in the intercomm transmission, the main scanning and the sub-scanning are fixed to 8 line per millimeter and 7.7 scanning lines per millimeter, respectively, in the case of transmitting a facsimile signal of 3.85 scanning lines per millimeter for sub-scanning which is the standard of G3 facsimile, the signal is transmitted for each line and, for receiving it, the same line is recorded twice. These operations are carried out by a memory in the facsimile signal processor COFX. As will be seen from this, it is sufficient for the facsimile terminal equipment FAX to perform fixed operations at all times and this permits simplification of the sub-scanning means. That is, the facsimile terminal equipment FAX can employ, as the sub-scanning means, a synchronous motor which cannot change its number of revolutions but is inexpensive and, further, the use of such a synchronous motor as the sub-scanning means settles the problem of noise and makes the scanning lines equally spaced, contributing to enhancement of the picture quality.

Figure 7:
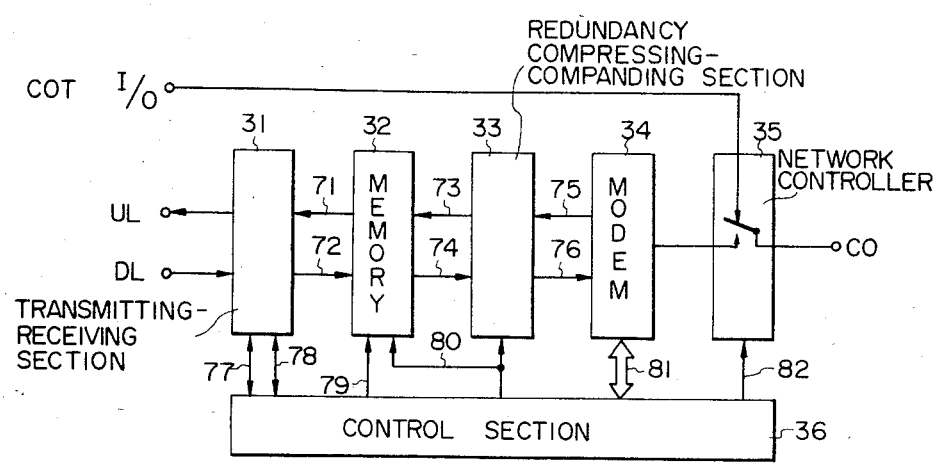
FIG. 7 is a block diagram illustrating an example of a facsimile CO line interface device for use in the present invention.

Next, a description will be given of the facsimile signal processor COFX. FIG. 7 is a block diagram illustrating an example of the facsimile signal processor COFX. A transmitting-receiving section 31 is exactly identical with that described previously in connection with the facsimile terminal equipment FAX. Reference numeral 71 indicates an upward P bit, 72 a downward P bit, 77 an S bit and 78 an S bit. A memory 32 is a buffer section for absorbing a difference between the intercomm transmission rate and the CO line transmission rate. Reference numeral 73 designates an input to the memory 32 and 74 an output therefrom. Reference numeral 79 identifies sub-scanning line density information, and 80 transmitting and receiving information for the CO line. A redundancy compressing-companding section 33 is a section whcih renders the redundancy of a facsimile signal into a compressed code and decodes the compressed signal by the same method as is used in G3 facsimle. Reference numeral 75 denotes an input to the redundancy compressing-companding section 33 and 76 an output therefrom. The redundancy compressing-companding section 33 may also be provided in the facsimile terminal equipment FAX. A MODEM 34 is a CO line interface circuit which is similar to that used in G3 facsimile and which has transmission rates 2400, 4800, 7200 and 9600 BPS and is selectively switched to one of them in accordance with the state of the CO line. Reference numeral 81 represents a bus through which a control section 36 transmits and receives a procedure signal (in the case of a procedure, the signal is transmitted or received at a transmission rate of 300 BPS) or controls the MODEM 34. An NCU 35 is a network controller which switches the input and output of the CO line interface COT and the modulated and demodulated signals by a switching signal 82. A control section 36 is a section which performs a communication via the CO line following the distant station's facsimile and G3 facsimile procedure in addition to communication operations with the facsimile interface FXIF through using the S bit or with the facsimile terminal equipment FAX through using the D bit. Informed of completion of the connection from the facsimile interface FXIF, the control section 36 instructs the network controller 35 to switch the CO line from the CO line interface COT to the MODEM 34. That is, the voice communication is switched to the facsimile communication by depressing the start switch by the operator of the facsimile terminal equipment FAX. Thereafter the control section 36 performs the procedure with the distant station facsimile via the CO line to determine the facsimile functions, such as the sub-scanning line density, a minimum transmission time for one line and so on, and indicates operating conditions to the memory 32 or the redundancy compressing-companding section 3 and, at the same time, requests the starts of transmission and reception. In case of transmission, a facsimile signal resulting from scanning at a constant speed in the facsimile terminal equipment is transmitted via the downward transmission line and supplied via the downward P bit 72 to the memory 32. The memory 32 has a FIFO (first in first out) structure, and the facsimile signal from the downward transmission line is stored at a fixed speed and, at the same time, since the redundancy compressing-companding section 33 encodes and transmits the facsimile signal, the amount of storage in the memory 32 increases and decreases at all times. However, since the signal speed of the downward transmission line is higher, the amount of storage increases as a whole and, in the worst case, the amount of storage reaches nearly equal to the amount of one frame of a picture (4 mega bits). Accordingly, the facsimile terminal equipment stops scanning upon completion of scanning of one picture and restarts the scanning after the facsimile signals stored in the memory 32 have all been output onto the CO line. In case of reception, coded facsimile signals from the CO line are decoded by the redundancy compressing-companding section 33 and stored in the memory 32, but they are not transmitted to the facsimile terminal equipment FAX until after they have been stored. The reason is that the transmission cannot be stopped because the synchronous motor is used for sub-scanning in the facsimile terminal equipment FAX. However, facsimile signals of the next picture received from the CO line during the transmission to the facsimile terminal equipment FAX are stored without interruption since the transmission rate to the facsimile terminal equipment FAX is higher. The above is a description of the facsimile signal processor COFX. By modifying the redundancy compressing-companding section 33 and the MODEM 34 to a MODEM for G2 facsimile (by CCITT recommendation T3), it is possible to communicate with G2 facsimile; by modifying the MODEM 34 and the network controller 35, the connection with a digital public communication circuit is also possible; and by substituting the redundancy compressing-companding section 33 with a character-code converting part (i.e.; a part which converts a character code to a character picture and converts it to a scanning signal), transmission such as telex can also be performed.

Next, a description will be given of the case of supplying additional information in the facsimile equipment made up of the devices described in the foregoing. In case of intercommunication among the facsimile terminal equipments FAX, the facsimile terminal equipment FAX at the transmitting side informs the facsimile terminal equipment FAX at the receiving side of the terminal numer (the name of installation) of the former by a control bit (the D bit) together with facsimile signals. The receiving side temporarily stores it and, at the completion of transmission of a picture, sends a request for holding the connection of a call to the facsimile interface FXIF of both of the transmitting side and the receiving side. When the next picture is not present, a request of clearance is provided. After sending the request of clearance to the central processor MPU, the facsimile interface FXIF confirms clear completion information and sends a request for reconnection with the additional information generator SIP to the central processor MPU, together with the telephone number of the additional information generator SIP. The telephone number of the additional information generator SIP has been supplied from the central processor MPU in advance. When the additional information generator SIP and the receiving facsimile terminal equipment FAX are interconnected to each other, the additional information generator SIP transmits, as facsimile signals, information such as the address of installation of the transmitting side, time and so forth and, upon completion of the transmission, the receiving facsimile terminal equipment FAX issues a request for clearance, clearing the connection of a call with the receiving facsimile terminal equipment FAX. Thereafter, in a case where the connection to the transmitting facsimile terminal equipment FAX is hold, the receiving facsimile terminal equipment FAX issues a request for reconnection to the facsimile interface FXIF, which provides to the central processor MPU the request for reconnection together with the temporarily stored telephone number of the transmitting facsimile terminal equipment FAX. The telephone number is common to the telephone set TEL to which the transmitting facsimile terminal equipment FAX forms an opposite party, but its communication path is completely independent of the telephone set TEL, and hence is connected to the facsimile interface FXIF on the transmitting side regardless of the state of use of the telephone set TEL. Further, the facsimile interface FXIF on the transmitting side informs the central processor MPU that no request for connection can be complied with during the holding, thereby preventing an interrupt from other facsimile terminal equipment FAX. However, when a request for reconnection occurs, the central processor MPU performs a connection with the facsimile interface FXIF at the transmitting side.

As described above, when a picture has been transmitted, the originating terminal equipment and the time of transmission can be recorded in the margin or the like on the end portion of a recording paper. The CO line communication, in which the facsimile terminal equipment FAX and the facsimile signal processor COFX are interconnected to each other, can be understood by substituting the facsimile signal processor COFX for the abovesaid receiving facsimile terminal equipment FAX in case of transmission to the CO line and by substituting the facsimile signal processor COFX for the abovesaid transmitting facsimile terminal equipment FAX. In this case, the information indicating a fact that the transmission was made from the CO line is added instead of the address of the installation of the transmitting facsimile terminal equipment.

Figure 8:
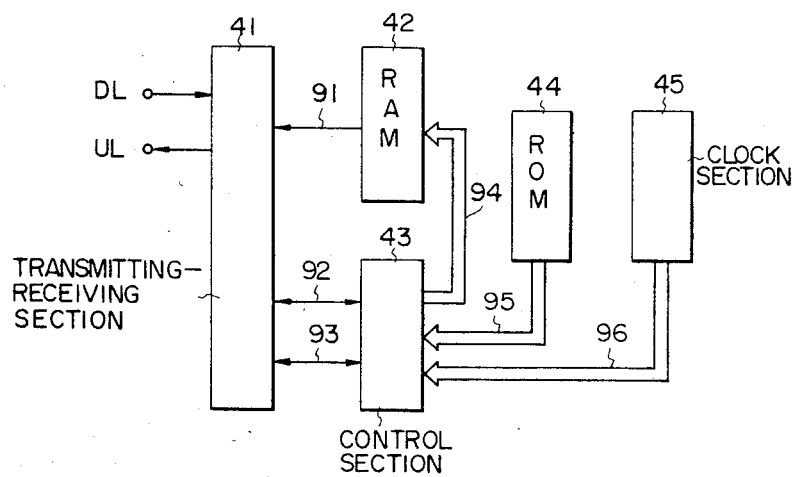
FIG. 8 is a block diagram illustrating an example of an additional information generator for use in the present invention.

FIG. 8 illustrates the arrangement of the additional information generator. A transmitting-receiving section 41 is a part which is similar to the facsimile terminal equipment FAX already described. Reference numeral 91 indicates upward P bits, 92 S bits and 93 D bits. A RAM 42 is a part by which character picture signals received via a control section 43 from a ROM 44 are disposed at desired positions on a frame of picture to be transmitted. By successively reading out the signals for each line, scanning signals similar to those of facsimile are obtained. The control section 43 performs, in addition to communication control using the S and D bits, a series of operations of applying to the ROM 44 the terminal number of the transmitting facsimile terminal equipment FAX received from the connected receiving facsimile terminal equipment FAX, receiving the corresponding character pictures from the ROM 44 and transferring them to the RAM 42, receiving time data from a clock section 45 and, for converting it into numerical pictures, providing numerical codes to the ROM 44 in succession to derive therefrom the corresponding numerical pictures and arranging them on the RAM 42, thereafter transmitting the pictures to the receiving facsimile terminal equipment FAX. Reference numerals 94, 95 and 96 show the flow of character pictures or data. The ROM 44 is a character generator which stores, as character images, the addresses of installation corresponding to the terminal numbers and stores numerical images corresponding to numerical codes. The clock section 45 is a part which generates clock pulses. Incidentally, the picture that is transmitted from the additional information generater SIP is about 40 lines (5 mm) in terms of the main scanning lines of facsimile and the picture transmission time necessary for one connection is very short, so that there is substantially no possibility of the time of using the additional information generator SIP overlapping.

As has been described in the foregoing, although the additional information printer is large-scale, its running time is very short as compared with the transmission time of a copy and its provision for each terminal is quite disadvantageous but if it is used in common to the terminals as in the present invention, its running time increases and the cost for each terminal is low; hence the common use is economical.

Moreover, in accordance with the present invention, a facsimile CO line interface device can be used in common to a plurality of facsimile terminal equipments and, further, in case of the frequency of use of the facsimile CO line interface device being high, an efficient and economical facsimile equipment can be provided by increasing such a interface device.

What we claim is:

1. A facsimile connection system comprising: a plurality of facsimile terminal equipments having no CO line interface circuit, at least one facsimile signal processor having a CO line interface circuit, and an exchange for interconnecting the plurality of facsimile terminal equipments and the facsimile signal processor, so that the facsimile terminal equipments can use the facsimile signal processor in common to the facsimile terminal equipments.

2. A facsimile connection system according to claim 1, in which the facsimile signal processor is provided with a memory capable of storing signals of more than frame of a picture, and in which the facsimile terminal equipments each perform sub-scanning at a fixed speed.

3. A facsimile connection system comprising: a plurality of facsimile terminal equipments, an additional information generator for supplying additional information of facsimile communication, at least one facsimile signal processor having a CO line interface circuit, and an exchange for interconnecting the plurality of facsimile terminal equipments, the additional information generator and the facsimile signal processor, so that the additional information generator and the facsimile signal processor may be used in common to the facsimile terminal equipments.

4. In a voice-facsimile transceiver communication system wherein voice and facsimile information is transmitted and received simultaneously comprising, a telephone system for voice communications, a plurality of facsimile transceiver apparatus for transmitting and receiving facsimile communication signals, means for converting voice communications and control signals of the telephone system to voice communication digital signals, means for converting facsimile communication signals of the facsimile transceiver apparatus facsimile digital signals, and control means receptive of the voice communication digital signals and of the facsimile digital signals for controlling by common means transmission of the voice communication digital signals and the facsimile communication digital signal simultaneously along separate paths between telephones of the telephone system and between corresponding ones of the plurality of the facsimile transceiver apparatus.

5. In a voice-facsimile transceiver communication system according to claim 4, including storing means of digital signals for effecting said simultaneously transmission of the voice and facsimile communication transmission signals.

6. In a voice-facsimile transceiver communication system according to claim 4, including coding and decoding means for the voice and facsimile communication digital signals.

* * * * *